United States Patent [19]

Borcea et al.

[11] Patent Number: 4,741,568
[45] Date of Patent: May 3, 1988

[54] METHOD AND MEANS FOR LIMITING THE EXTENT OF RELEASE TRAVEL OF PISTON-OPERATED GRIPPERS

[75] Inventors: Nicky Borcea, Weston; Alexandrv D. Ionescu, Easton, both of Conn.

[73] Assignee: Robohand Inc., Trumbull, Conn.

[21] Appl. No.: 65,519

[22] Filed: Jun. 23, 1987

Related U.S. Application Data

[63] Continuation-in-part of Ser. No. 852,614, Apr. 16, 1986, abandoned.

[51] Int. Cl.[4] .................. B25B 15/08; B75J 15/00
[52] U.S. Cl. ......................... 294/88; 294/106; 294/115
[58] Field of Search ............ 294/88, 106, 115, 95, 294/97, 116, 100; 269/34, 218, 233, 234; 414/739, 753

[56] References Cited

U.S. PATENT DOCUMENTS

| | | | |
|---|---|---|---|
| 4,607,893 | 8/1986 | Nusbaumer et al. | 294/88 |
| 4,660,877 | 4/1987 | Schmidt et al. | 294/88 |

*Primary Examiner*—James B. Marbert
*Attorney, Agent, or Firm*—Mattern, Ware, Stoltz & Fressola

[57] ABSTRACT

A piston-operated robotic gripper system has gripper means including a piston mounted within a cylinder for movement between a first position and a second position, with the piston operatively linked to move grasping means between a first retracted position and a second extended position corresponding to the first and second piston positions, respectively. Conduit means are connected to first and second sides of the piston to introduce pressurized fluid into the cylinder on the first side of the piston to cause the piston and grasping means to move to their first positions and to introduce pressurized fluid into the cylinder on the second side of the piston while exhausting the fluid from the cylinder on the first side of the piston to cause the piston and grasping means to move to their second positions. Valve means located in conduit means connected to the second side of the piston stops the exhausting of fluid from the cylinder on the first side of the piston, so that the remaining fluid on that side will increase in pressure until the force acting on the first side of the piston equals the force acting on the second side of the piston, thereby causing the piston and the grasping means to be held at positions intermediate to their first and second positions.

14 Claims, 2 Drawing Sheets

METHOD AND MEANS FOR LIMITING THE EXTENT OF RELEASE TRAVEL OF PISTON-OPERATED GRIPPERS

The present application is a continuation-in-part of U.S. application Ser. No. 852,614, filed Apr. 16, 1986, now abandoned, assigned to the assignee of the present invention.

TECHNICAL FIELD

This invention relates to piston-operated grippers for mechanically grasping objects and more particularly to a method and means for limiting the extent of release travel of grippers for use on robot hands.

BACKGROUND ART

A number of mechanical grippers have been developed in the art which address the problem of grasping objects. Typically, these grippers are used in conjunction with some form of robot arm to which they are attached and, also typically, grasping/releasing motion is achieved by a pressurized operator mechanism which includes a cylinder and a piston, with the piston mechanically coupled to fingers or other means which grasp the object. Fluid pressure applied to one side of the piston causes the fingers to grasp the object, while fluid pressure applied to the other side of the piston causes the fingers to release the object. Such grippers are typified by the devices described in U.S. Pat. Nos. 4,492,400 and 4,540,212 and in copending U.S. application Ser. No. 852,614, assigned to the assignee of the present invention. In each of the grippers theredescribed, as well as in other known grippers of like type, when the piston is actuated to release the object, it moves to the maximum extent in the direction causing the release, thus causing the fingers to travel to their maximum open position, whether or not this extent of travel is necessary to release the object. In some cases, the maximum travel results in objectionable interference with other objects.

An example of such an objectionable interference is in the robotic placing of components on printed circuit boards, where the dense arrangement of components already inserted on a board complicates the inserting of additional components when the robotic gripper employed opens to its maximum extent each time a component is placed. The present invention minimizes this complication by limiting the extent of travel of the gripper upon release of an object, as hereinafter described.

SUMMARY OF THE INVENTION

While the present invention is described for convenience as applied to a piston-operated parallel motion gripper having a particular configuration, it will be understood that it may be applied as well to parallel motion grippers having other configurations, as well as to any of a number of other motion grippers of the piston-operated type wherein it is desired to limit the extent of travel of the gripper in the release mode.

A parallel motion gripper may comprise an upper housing having a cylindrically-shaped recess into which a fluid-operated piston is placed. The piston is operated by fluid pressure so as to move between upper and lower positions. Pressurized fluid is supplied through conduits connected to the cylindrical recess above and below the piston. Mounted to the piston shaft is a double-rack having teeth mounted on opposite sides thereof. The teeth on each side of the rack engage with spur gears which are in turn mounted within a lower housing. A pair of jaws having gear teeth formed in their upper face are grooved for back-and-forth movement along longitudinally elongated rails which define a rectangular opening at the distal end of the lower opening. These jaws are referred to as "rack jaws" and may include means for the mounting of custom fingers and the like. The gear teeth of these rack jaws mesh with the spur gears so that turning of the spur gears causes the rack jaws to move along the longitudinal rail path in opposite directions but in equal distances. Thus, when fluid pressure is applied below the piston and any fluid above the piston is exhausted, the rack jaws will move horizontally to abut one another or to grasp an object; and, when fluid pressure is applied above the piston and any fluid below the piston is exhausted, the rack jaws will move horizontally to release the object and will continue to move until they abut the terminating ends of the opening.

The present invention provides for limiting the extent of travel after an object is released by maintaining a predetermined level of fluid pressure below the piston after the object is released so that the movement of the rack jaws toward the terminating ends of the opening will cease at a selected position. This occurs when the force acting to move the piston upwards is equal to the force acting to move the piston downwards. The required level of pressure below the piston is achieved by preventing the flow of fluid from below the piston so that the movement of the piston downwards will compress the fluid remaining below the piston until the forces acting on the upper and lower faces of the piston are equal. The preventing of the flow of fluid from below the piston is achieved by closing valve means in the conduit connected to the cylindrical recess below the piston.

When a noncompressable fluid is employed, flow of fluid from below the piston is stopped at some point after the piston begins to move downwards. The point at which the fluid flow is stopped may be determined by measuring fluid pressure below the piston or by reference to a fixed interval of time beginning when the flow of pressurized fluid from below the piston commences. Because of the noncompressable fluid, motion of the piston and therefore the motion of the rack jaws will cease almost instantly.

OBJECTS OF THE INVENTION

It is a principal object of the invention to provide a method and means for limiting the extent of travel of the fingers of piston-operated robotic grippers, so that upon release of an object grasped by the fingers, additional opening movement of the fingers may be stopped at a selected position.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in conjunction with the following drawings in which.

BEST MODE FOR CARRYING OUT THE INVENTION

Figure 1:
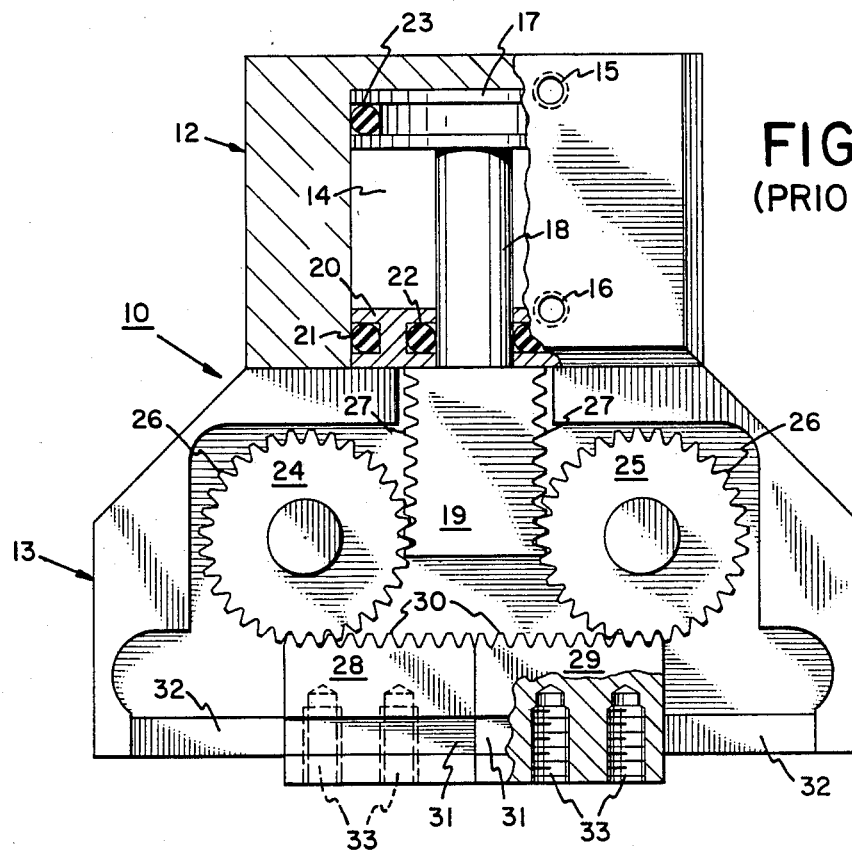
FIG. 1 is a side, partially cross-sectional view of a parallel motion gripper of one configuration, showing the rack jaws, spur gears, double rack, piston, and upper and lower housings in the first closed position.
Figure 2:
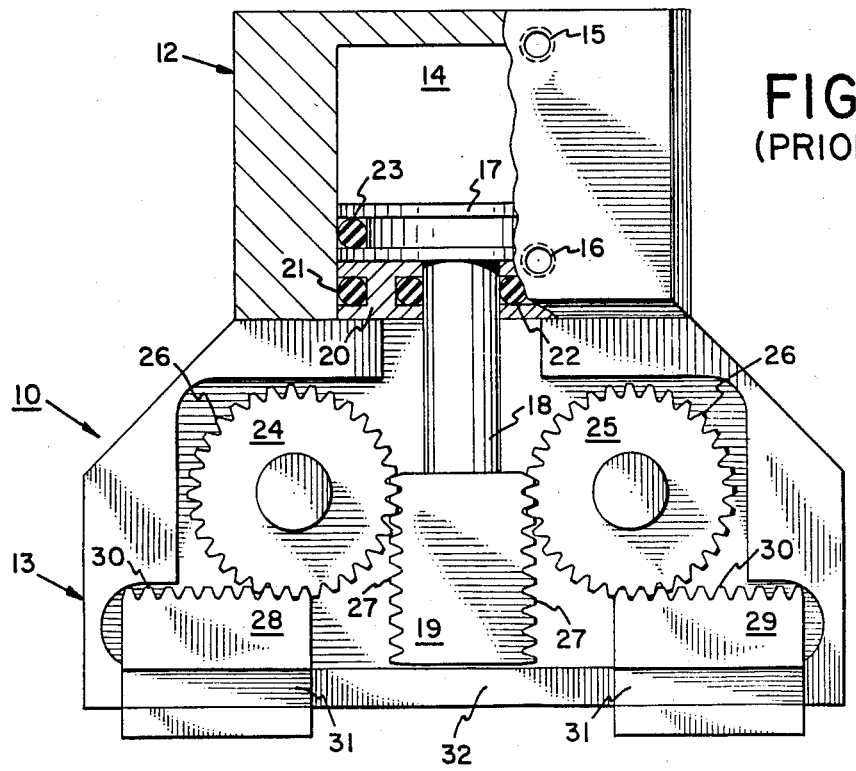
FIG. 2 is a side, partially cross-sectional view of the parallel motion gripper shown on FIG. 1, but with the rack jaws, gears, double rack, and piston in the second position.

As seen in FIGS. 1 and 2, a parallel motion gripper 10 of one configuration comprises an upper housing 12 and a lower housing 13. The upper housing 12 may include means (not shown) for mounting to a robot arm or the like. The upper housing 12 includes a cylinder 14 and upper and lower inlet/outlets 15 and 16, respectively, for introducing and exhausting pressurized fluid to and from the cylinder. Mounted within the cylinder is a piston 17 having a shaft 18. Mounted at the end of the shaft 18 opposite from the piston 17 is a double rack 19. As can readily be seen on FIGS. 1 and 2, the piston 17 can move between a first, upper position, as seen in FIG. 1, to a second, lower position, as seen in FIG. 2. The upper position of piston 17 results when the force generated by the pressurized fluid on the lower surface of the piston is greater than the force generated by the fluid on the upper surface of the piston. Conversely, the position shown on FIG. 2 results when the force generated by the pressurized fluid on the upper surface of the piston 17 is greater than that generated by the fluid on the lower surface of the piston. The pressurized fluid may be either a gas or a liquid.

In order to prevent the pressurized fluid from escaping from cylinder 14, a cylinder end cap 20 is positioned at the lower end the cylinder, the end cap having outer and inner O-rings 21 and 22, respectively. Similarly, the piston 17 has an O-ring 23 for preventing the passage of fluid between the piston and the walls of the cylinder 14.

A pair of spur gears 24 and 25 are rotatably mounted to lower housing 13 so that their teeth 26 mesh with the teeth 27 in double rack 19. Rack jaws 28 and 29 each have a generally rectangular shape with gear teeth 30 on their upper faces with grooves 31 formed on both sides so as to ride along rail 32 on the half shown of lower housing 13 and along a corresponding rail (not shown) on other half of the housing. Rail 32 and the corresponding rail form an elongated rectangular opening in which the rack jaws 28 and 29 travel. Threaded holes 33 may be formed within rack jaws 28 and 29 so as to provide mounting holes for various types of fingers or other grasping devices. Such fingers would move back and forth with the rack jaws 28 and 29.

Figure 3:
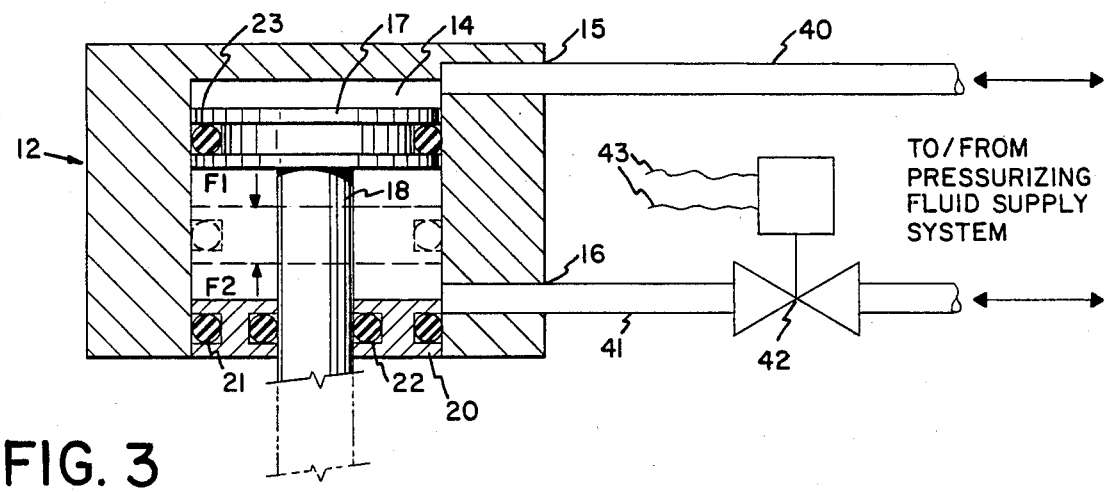
FIG. 3 shows schematically the operation of the present invention.

FIG. 3 is partially a cross-sectional view of the upper housing 12 of FIGS. 1 and 2 which illustrates schematically the operation of the present invention. Supply/return lines 40 and 41 are attached to inlet/outlets 15 and 16 of upper housing 12 for connection to a pressurizing fluid supply system (not shown), and a solenoid shutoff valve 42 is located in supply/return line 41. The piston 17 is shown at a first intermediate position in the cylinder 14 and it may be assumed that the rack jaws 28 and 29 of FIGS. 1 and 2, or fingers mounted to them are grasping an object. This requires that the valve 42 be open and that pressurized fluid has entered the cylinder 14 below the piston 17 through supply/return line 41 and that any fluid pressure above the piston has been relieved through supply/return line 40. Thus, the force acting on the lower face of the piston is greater than the force acting on the upper face of the piston 17. When the object is to be released, pressurized fluid enters the cylinder 14 above the piston 17 through supply/return line 40 and valve 42 is closed by an electrical signal through conductors 43. This causes the fluid below piston 17 to compress and its pressure to rise. When this pressure has risen sufficiently that the force F2 acting on the lower face of piston 17 is equal to the force F1 acting on the upper face of the piston, the piston will stop and will be held at an intermediate position such as shown in dashed lines on FIG. 3. These forces will be equal when the pressure above piston 17 times the area of its upper face equals the pressure below the piston times the area of its lower face; or, when $(P \times A)$upper$=(P \times A)$lower. It will be understood from an inspection of FIGS. 1 and 2 that, with the piston held at an intermediate position, the rack jaws 28 and 29 will also be held at some intermediate position short of the ends of rail 32. It will also be understood that shutoff means existing within the pressurizing fluid supply system could be employed to stop the flow of liquid in supply/return line 41 instead of employing separate valve 42.

The principle determining the extent of travel of the piston 17 can be more fully understood by reference to the following, where "1" refers to conditions above the piston, "2" refers to conditions below the piston, and "F", "P", "V", "T", and "Ht" refer to force, pressure, volume, temperature, and piston height, respectively: From the well known relationship for pressure, volume, and temperature, $P2(\text{start}) \times V2(\text{start})/T2(\text{start}) = P2(\text{end}) \times V2(\text{end})/T2(\text{end})$. Assuming that $T2(\text{start}) = T2(\text{end})$ and considering that $V = A \times Ht$, the main equation becomes $P2(\text{start}) \times A2 \times Ht(\text{star}) = P2(\text{end}) \times A2 \times Ht(\text{end})$. From the preceding paragraph, it is known that at equilibrium, $F1(\text{end}) = P1(\text{end}) \times A1 = F2(\text{end}) = P2(\text{end}) \times A2$, and, solving for $P2(\text{end})$, $P2(\text{end}) = [P1(\text{end})]/A1/A2$. Substituting this in the main equation and considering that $P2(\text{start}) = P1(\text{end})$, since they are both equal to the supply pressure, the main equation becomes $P1(\text{end}) \times A2 \times Ht(\text{start}) = P1(\text{end}) \times A1/A2 \times A2 \times Ht(\text{end})$. Now, cancelling like terms in, and rearranging the main equation, the main equation becomes $Ht(\text{end}) = Ht(\text{start}) \times A2/A1$. Thus, is can be seen that the distance of travel of the piston is directly related to the ratio of the upper and lower surface areas of the piston.

When the fluid is essentially noncompressable, the valve 42 will be closed at some point after the piston 17 has begun its downwards movement. The point at which valve 42 is closed, in this case, may be determined as some interval of time after pressure is applied to the upper face of piston 17 or it may be determined with reference to some pressure level in the cylinder 14 below piston 17 or in the supply/return line 41.

It can be seen from the above, that the degree of travel of piston 17 after the closing of valve 42 will depend on the pressurizing fluid used, with a short, almost negligible length of travel resulting if the fluid is a liquid and some longer length of travel resulting if the fluid is a gas.

Figure 4:
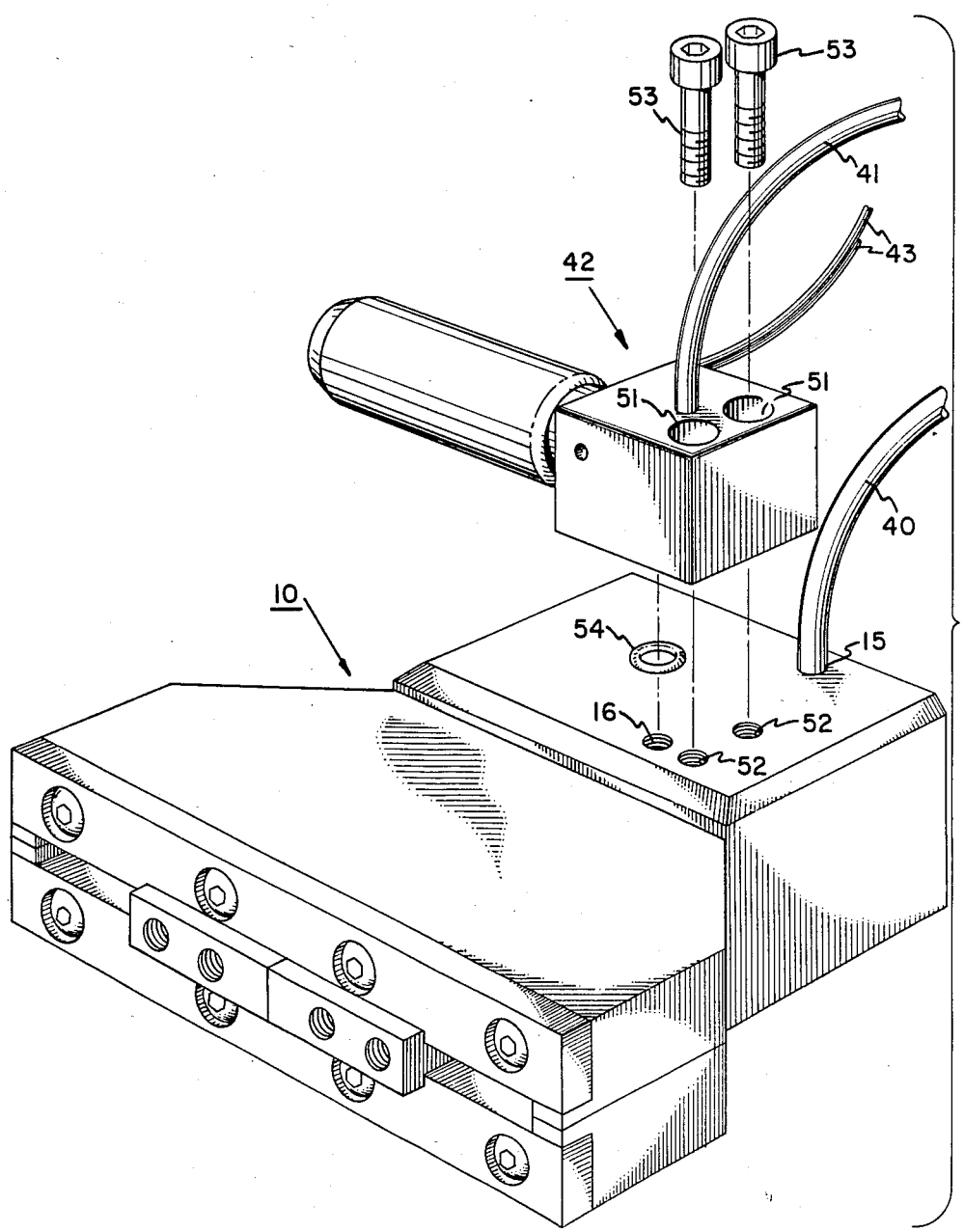
FIG. 4 is an exploded perspective view of an embodiment of the present invention.

FIG. 4 is an exploded perspective view of an embodiment of a system employing the present invention, which includes a parallel motion gripper 10 and solenoid shutoff valve 42 controlled by electrical signals in conductors 43. The body of valve 42 includes holes 51 which are aligned with threaded holes 52 in gripper 10 for receipt of machine screws 53. O-ring 54 provides a seal between gripper 10 and valve 42. Supply/return conduit 40 is attached to inlet/outlet 15 and supply/return conduit 41 is attached to the inlet side of valve 42 the outlet side of which opens directly into inlet/outlet 16. Valve 42 is actuated by electrical signals through conductors 43. Operation of the system shown is the same as described with reference to FIG. 3.

Thus, what has been described is a method and means for limiting the extent of release travel of the fingers of a piston-operated robotic gripper, which comprises valve means inserted in the fluid line connected to the cylinder on that side of the piston which, when pressure on such side is relieved and pressure is applied to the opposite side of the piston, the fingers move in an opening direction. Closing of valve means causes the pressure in the cylinder on such side of the piston to increase to such degree that the piston and, consequently, the fingers, will be held at some intermediate position between their fully open and fully closed positions.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limited sense.

It is also to be understood that the following claims are intended to cover all of the generic and specific features of the invention herein described, and all statements of the scope of the invention which, as a matter of language, might be said to fall therebetween.

We claim:

1. In a piston-operated robotic gripper system having a piston mounted within a cylinder for movement between a first position and a second position, with the piston operatively linked to move grasping means between a first retracted position and a second extended position corresponding to the first and second piston positions, respectively, movement of the piston being achieved by introducing pressurized fluid through a conduit into the cylinder on a first side of the piston to cause the piston and grasping means to move to their first positions and introducing pressurized fluid through a conduit into the cylinder on a second side of the piston while exhausting the fluid from the cylinder on the first side of the piston to cause the piston and grasping means to move to their second positions; a method of selectively limiting the extended position of the grasping means, comprising: stopping the exhausting of fluid from the cylinder on the first side of the piston, so that the remaining fluid on that side will increase in pressure until the force acting on the first side of the piston equals the force acting on the second side of the piston and the piston and grasping means are held at positions intermediate to their first and second positions.

2. The method, as defined in claim 1, wherein the method of stopping the flow of fluid comprises closing a valve in the conduit connected to the cylinder on the first side of the piston.

3. The method, as defined in claim 1, wherein the pressurized fluid is a liquid.

4. The method, as defined in claim 1, wherein the pressurized fluid is a gas.

5. The method, as defined in claim 2, wherein the valve is closed at some point after the piston has started to move to its second position.

6. A piston-operated robotic gripper system, comprising:
    (a) a piston mounted within a cylinder for movement between a first position and a second position;
    (b) grasping means operatively linked to the piston to move between a first retracted position and a second extended position corresponding to the first and second piston positions, respectively;
    (c) means to introduce pressurized fluid into the cylinder on a first side of the piston to cause the piston and grasping means to move to their first positions and to introduce pressurized fluid into the cylinder on a second side of the piston while exhausting the fluid from the cylinder on the first side of the piston to cause the piston and grasping means to move to their second positions; and
    (d) means to stop the exhausting of fluid from the cylinder on the first side of the piston, so that the remaining fluid on that side will increase in pressure until the force acting on the first side of the piston equals the force acting on the second side of the piston, thereby causing the piston and the grasping means to be held at selected positions intermediate to their first and second positions.

7. A piston-operated gripper system, as defined in claim 6, wherein means to stop the exhausting of fluid is a valve.

8. A piston-operated gripper system, as defined in claim 6, wherein the system is adapted to utilize a liquid as the pressurized fluid.

9. A piston-operated gripper system, as defined in claim 6, wherein the system is adapted to utilize a gas as the pressurized fluid.

10. A piston-operated robotic gripper system, comprising:
    (a) gripper means including a piston mounted within a cylinder for movement between a first position and a second position, with the piston operatively linked to move grasping means between a first retracted position and a second extended position corresponding to the first and second piston positions, respectively:
    (b) conduit means connected to first and second sides of the piston to introduce pressurized fluid into the cylinder on the first side of the piston to cause the piston and grasping means to move to their first positions and to introduce pressurized fluid into the cylinder on the second side of the piston while exhausting the fluid from the cylinder on the first side of the piston to cause the piston and grasping means to move to their second positions; and
    (c) valve means located in the conduit means connected to the second side of the piston to stop the exhausting of fluid from the cylinder on the first side of the piston, so that the remaining fluid on that side will increase in pressure until the force on the first side of the piston equals the force on the second side of the piston and thereby cause the piston and grasping means to be held at positions intermediate to their first and second positions.

11. A piston-operated robotic gripper system, as defined in claim 10, wherein the valve means is mounted directly to the gripper means so that the fluid on the first side of the piston communicates directly with the valve means.

12. A piston-operated robotic gripper system, as defined in claim 10, wherein the valve means is a solenoid valve.

13. A piston-operated robotic gripper system, as defined in claim 10, wherein the system is adapted to be operated with compressed air as the pressurized fluid.

14. A piston-operated robotic gripper system, as defined in claim 10, wherein the system is adapted to be operated with a liquid as the pressurized fluid.

* * * * *